United States Patent [19]

Faul et al.

[11] Patent Number: 5,247,589
[45] Date of Patent: Sep. 21, 1993

[54] METHOD FOR ENCODING COLOR IMAGES

[75] Inventors: Jerome F. Faul, Paris, France; Julien T. Nguyen, Redwood City, Calif.

[73] Assignee: Radius Inc., San Jose, Calif.

[21] Appl. No.: 691,721

[22] Filed: Apr. 26, 1991

Related U.S. Application Data

[63] Continuation-in-part of Ser. No. 588,560, Sep. 26, 1990, Pat. No. 5,070,532.

[51] Int. Cl.⁵ .............................................. G06K 9/00
[52] U.S. Cl. ...................................... 382/56; 358/433
[58] Field of Search ...................... 382/56; 358/37, 75, 358/78, 80, 433, 316, 261.3; 364/715.02, 526; 340/701

[56] References Cited

U.S. PATENT DOCUMENTS

| | | | |
|---|---|---|---|
| 3,694,813 | 9/1972 | Loh et al. | 340/172.5 |
| 4,101,959 | 7/1978 | Domike et al. | 364/200 |
| 4,194,221 | 3/1980 | Stoffel | 358/283 |
| 4,300,122 | 11/1981 | McMahon | 340/146.3 |
| 4,319,267 | 3/1982 | Mitsuya et al. | 358/75 |
| 4,467,421 | 8/1984 | White | 364/200 |
| 4,580,134 | 4/1986 | Campbell et al. | 340/703 |
| 4,622,545 | 11/1986 | Atkinson | 340/747 |
| 4,631,521 | 12/1986 | El-Sherbini | 340/347 |
| 4,646,356 | 2/1987 | Anderson et al. | 382/56 |
| 4,673,977 | 6/1987 | Steizenmuller | 358/133 |
| 4,686,578 | 8/1987 | Asano | 358/280 |
| 4,707,729 | 11/1987 | Bruno et al. | 358/13 |
| 4,729,127 | 3/1988 | Chan et al. | 382/56 |
| 4,743,959 | 5/1988 | Frederiksen | 358/11 |
| 4,743,973 | 5/1988 | Endo et al. | 358/260 |
| 4,764,975 | 8/1988 | Inoue | 382/47 |
| 4,788,598 | 11/1988 | Ochi et al. | 358/260 |
| 4,797,945 | 1/1989 | Suzuki et al. | 382/56 |
| 4,831,659 | 5/1989 | Miyaoka et al. | 382/56 |
| 4,866,514 | 9/1989 | Yeomans | 358/80 |
| 4,914,508 | 4/1990 | Music | 358/13 |
| 4,922,349 | 5/1990 | Abe et al. | 358/443 |
| 4,965,754 | 10/1990 | Stansfield et al. | 364/526 |
| 4,965,845 | 10/1990 | Chan et al. | 382/56 |
| 4,972,497 | 11/1990 | Saito et al. | 382/56 |
| 4,980,764 | 12/1990 | Henot | 358/133 |

FOREIGN PATENT DOCUMENTS

| | | | |
|---|---|---|---|
| 2538724 | 3/1977 | Fed. Rep. of Germany | 358/427 |
| 0079569 | 6/1980 | Japan | 358/426 |
| 0030366 | 3/1981 | Japan | 358/426 |
| 0200670 | 11/1983 | Japan | 358/426 |
| 1556368 | 11/1979 | United Kingdom | 358/427 |

OTHER PUBLICATIONS

Huang et al., Facsimile Coding by Skipping White, IEEE Trans. on Comm., vol. 23, No. 12 at 1452 (Dec. 1975).

Primary Examiner—Leo H. Boudreau
Attorney, Agent, or Firm—Stuart P. Meyer

[57] ABSTRACT

Color image information is encoded by grouping together adjacent pixels into blocks, determining which one of several templates each block most closely approximates, and encoding each block in accordance with the rules for a particular template. Data compression without loss of image quality results because the encoding rules for each template ignore irrelevant or duplicative information, thereby saving space for information that is important.

2 Claims, 7 Drawing Sheets

Microfiche Appendix Included
(1 Microfiche, 17 Pages)

BLOCK OF 4 × 1 PIXELS

$y_1, u_1, v_1$ | $y_2, u_2, v_2$ | $y_3, u_3, v_3$ | $y_4, u_4, v_4$

4 BITS OF CASE #

32 BITS OF CODE

| bit | 0 | 7 | 8 | 15 | 16 | 23 | 24 | 31 |

| # | | | | | | |
|---|---|---|---|---|---|---|
| 1 | y1 | y2 | y3 | y4 | | |
| 2 | y1 = y2 | y3 = y4 | u1 = u2 = u3 = u4 | v1 = v2 = v3 = v4 | | |
| 3 | y1 | y2 = y3 = y4 | u1 = u2 = u3 = u4 | v1 = v2 = v3 = v4 | | |
| 4 | y1 = y2 = y3 | y4 | u1 = u2 = u3 = u4 | v1 = v2 = v3 = v4 | | |
| 5 | Y1 = Y4 | Y2 = Y3 | u1 = u2 = u3 = u4 | v1 = v2 = v3 = v4 | | |
| 6 | y1 | y2 | y3 | y4 | u1 = u2 = u3 = u4 | v1 = v2 = v3 = v4 |
| 7 | y1 | u1 | v1 | y2 = y3 = y4 | u2 = u3 = u4 | v2 = v3 = v4 |
| 8 | y2 | u2 | v2 | y3 = y4 = y1 | u3 = u4 = u1 | v3 = v4 = v1 |
| 9 | y3 | u3 | v3 | y4 = y1 = y2 | u4 = u1 = u2 | v4 = v1 = v2 |
| 10 | y4 | u4 | v4 | y1 = y2 = y3 | u1 = u2 = u3 | v1 = v2 = v3 |
| 11 | y1 = y2 | u1 = u2 | v1 = v2 | y3 = y4 | u3 = u4 | v3 = v4 |
| 12 | y2 = y3 | u2 = u3 | v2 = v3 | y4 = y1 | u4 = u1 | v4 = v1 |
| 13 | y1 = y3 | u1 = u3 | v1 = v3 | y2 = y4 | u2 = u4 | v2 = v4 |
| 14 | y1 | u1 | v1 | y2 = y3 | u2 = u3 | v2 = v3 | y4 | u4 | v4 |
| 15 | y1 | y2 | u1 = u2 | v1 = v2 | y3 | y4 | u3 = u4 | v3 = v4 |
| 16 | y1 | u1 | v1 | y2 | u2 | v2 | y3 | u3 | v3 | y4 | u4 | v4 |

Figure 3

Figure 4 no color

Case 0

1 color

Case 1

Case 2

Case 5

2 colors

Case 6

Case 7

Case 8

Case 9

Case 10

Case 11

Case 12

Case 14

3 colors

Case 13

4 colors

Case 15

METHOD FOR ENCODING COLOR IMAGES

RELATED APPLICATION

This application is a continuation-in-part of U.S. patent application Ser. No. 07/588,560 filed Sep. 26, 1990 now U.S. Pat. No. 5,070,532, issued Dec. 3, 1991 and incorporates by reference all material therein.

MICROFICHE APPENDIX

In accordance with 37 C.F.R.1.96(b), a computer code listing consisting of one microfiche with a total of 17 frames is submitted herewith as an appendix.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND FIELD OF THE INVENTION

This invention relates generally to the storage, processing and transmission of image information and specifically to a method of efficiently encoding color image information to be displayed or printed.

Color images are conventionally encoded and processed in display or printing systems by parsing the images into component signals and operating on those component signals. In raster-type display systems, it is common to parse color image information into a number of pixels and to provide separate R, G and B signals corresponding to the red, green and blue components of each pixel, respectively. Another common method is to parse the image information into pixels and to provide separate y, u and v signals defining the luminance, hue and saturation of the image.

Digital representation of color images is typically accomplished by representing each pixel of an image by an encoded binary number. It is commonly thought that 256 levels each of red, green and blue information are required to adequately represent the entire visual range to the human eye. Therefore, it is common to assign eight bits to each of the R, G and B signals to form a 24 bit digital word conveying the information for each pixel.

However, it is comparatively more difficult to process 24 bit pixel information than it is to process pixel information that uses fewer bits. Where computing capability is somewhat limited, fewer bits will sometimes be used at the expense of image quality.

Use of a lower pixel depth (number of bits per pixel) affects different types of images or image portions differently. For some image portions, there may be little noticeable difference between a 24 bit pixel depth and an eight bit pixel depth. For other image portions, the difference in image quality may be significant.

SUMMARY OF THE INVENTION

In accordance with the present invention, an encoding algorithm is employed to determine which one of several types of image templates a set of adjacent pixels most closely approximates. Depending upon the result of this selection, each pixel in the set is encoded with information in a manner that is most efficient in yielding a satisfactory result when the information is decoded and displayed or printed. By this allocation of different blocks of pixels to different encoding schemes, an eight, nine or twelve bit pixel depth may be used to achieve images of almost identical quality to images conventionally displayed using 24 bit pixel depth.

DETAILED DESCRIPTION OF THE DRAWINGS

Figure 1:
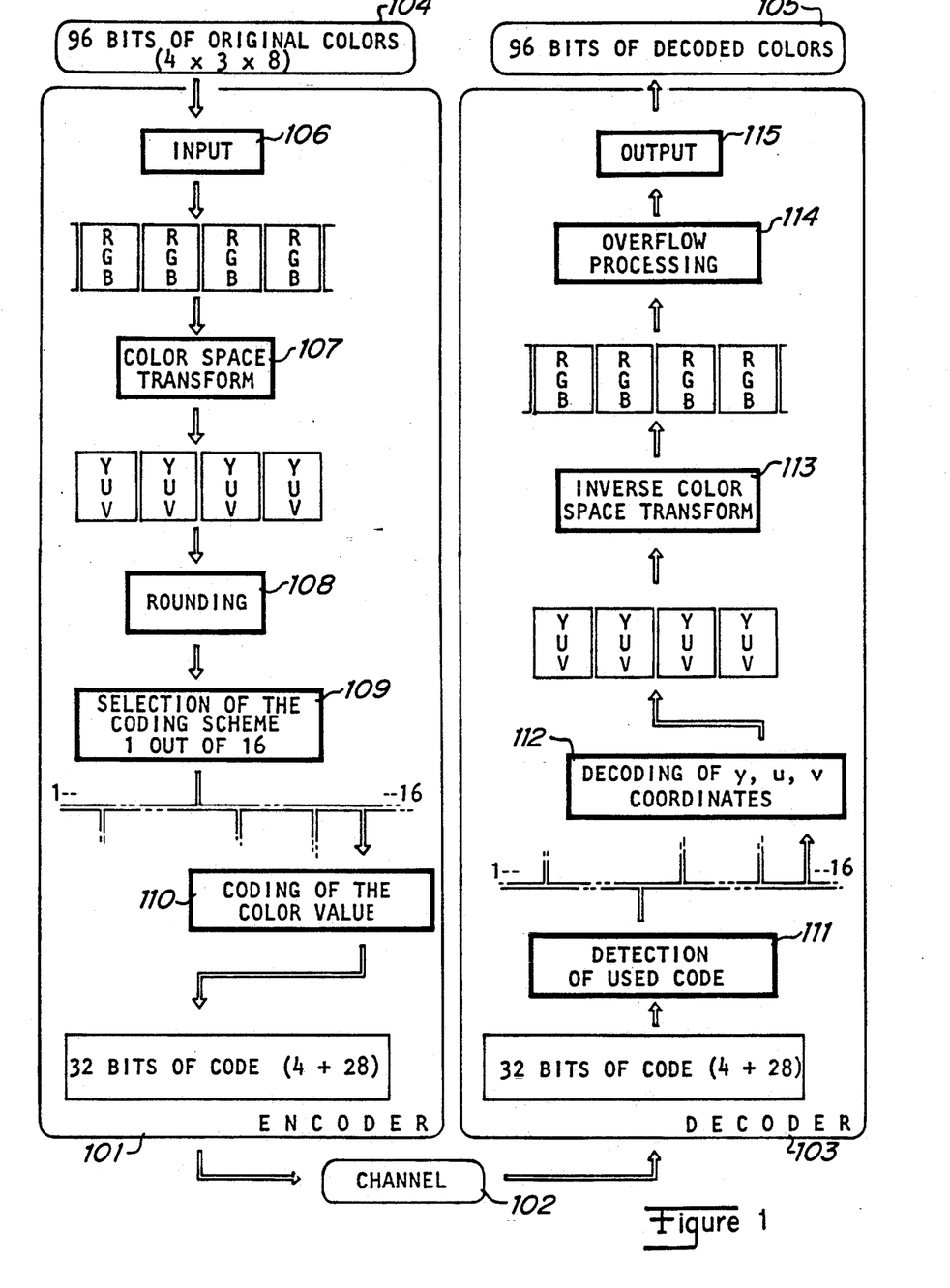
FIG. 1 is a functional block diagram of encoding and decoding operations in accordance with the present invention.

Referring now to FIG. 1, there is shown a block diagram of encoding and decoding operations in accordance with the present invention. In general terms, the implementation of FIG. 1 operates by applying input color information 104 to an encoder 101, transmitting (and, if desired, processing) the encoded information over a channel 102, and operating on that information by a decoder 103 to yield output color information 105 for display or printing.

More specifically, the processing of the encoder 101 comprises an input stage 106, a transform stage 107, a rounding stage 108, a pixel configuration detection stage 109, and a color coordinate coding stage 110.

In the preferred embodiment, a conventional 24 bit pixel depth RGB digital video signal from a bit-mapped image is applied to the input stage 106. The input stage 106 reads this information in groupings of adjacent pixels. In the preferred embodiment, the input stage 106 reads four adjacent pixels at a time.

The transform stage 107 converts the RGB pixel information into a new color space. Such transformation decorrelates the color components of the input signal 104 and increases the efficiency of the pixel configuration detection and allocation that is to follow. In the preferred embodiment, the transform used is:

$$y = r/4 + g/2 + b/4 \qquad \text{(Eq. 1)}$$
$$u = r/2 - g/4 - b/4$$
$$v = g/2 - b/2$$

with the corresponding reverse transform:

$$r = y + 3u/2 - v/4 \quad \text{(Eq. 2)}$$
$$g = y - u/2 + 3v/4$$
$$b = y - u/2 - 5v/4$$

where r, g and b are the red, green and blue components from the applied input signal; r, g, b and y vary from 0 to 255; u and v vary from −128 to 127.

These particular transform equations were chosen because they are quite simple and yield signals y, u and v that relate to the luminance, hue and saturation signals conventionally used in presenting color images on raster-type displays. More specifically, y approximates but is not directly proportional to the conventional signal for luminance, and in the (u, v) plane, the polar coordinates of vector x=(2u, 3v) are the conventional hue and saturation signals.

Once y, u and v are calculated from r, g and b in transform stage 107, these values are rounded in stage 108. The rounding formula is:

$$y' = [y + \tfrac{1}{2}] \quad \text{(Eq. 3)}$$
$$u' = [u + \tfrac{1}{2}] \text{ if } u \geq 0$$
$$u' = [u - \tfrac{1}{2}] \text{ else}$$
$$v' = [v + \tfrac{1}{2}] \text{ if } v \geq 0$$
$$v' = [v - \tfrac{1}{2}] \text{ else}$$

where $[x]=n$ if $x \geq 0$, $[x]=n+1$ if $x<0$, and $n \leq x < n+1$, where n is an integer.

This rounding minimizes the mean square error on y, u and v. The value of $\tfrac{1}{2}$ is added or subtracted in the above equations to provide rounding rather than simple truncation. Even so, the mean error on y resulting from such rounding is equal to $\tfrac{1}{2}$. In order to compensate for this error, a corresponding rounding function is performed in the decoder 103, specifically:

$$r = [r' + \tfrac{1}{2}] \quad \text{(Eq. 4)}$$
$$g = [g' + \tfrac{1}{2}]$$
$$b = [b' + \tfrac{1}{2}]$$

After forward and reverse transforms the mean error is equal to 0, on a first approximation. The advantage of this 0 value is that the encoding and decoding operations can be iterated without a shift in the colors displayed. A very small change in the value of the mean error (as small as $\tfrac{1}{2}$) will create bright or dark dots on the display after several iterations.

Figure 2:
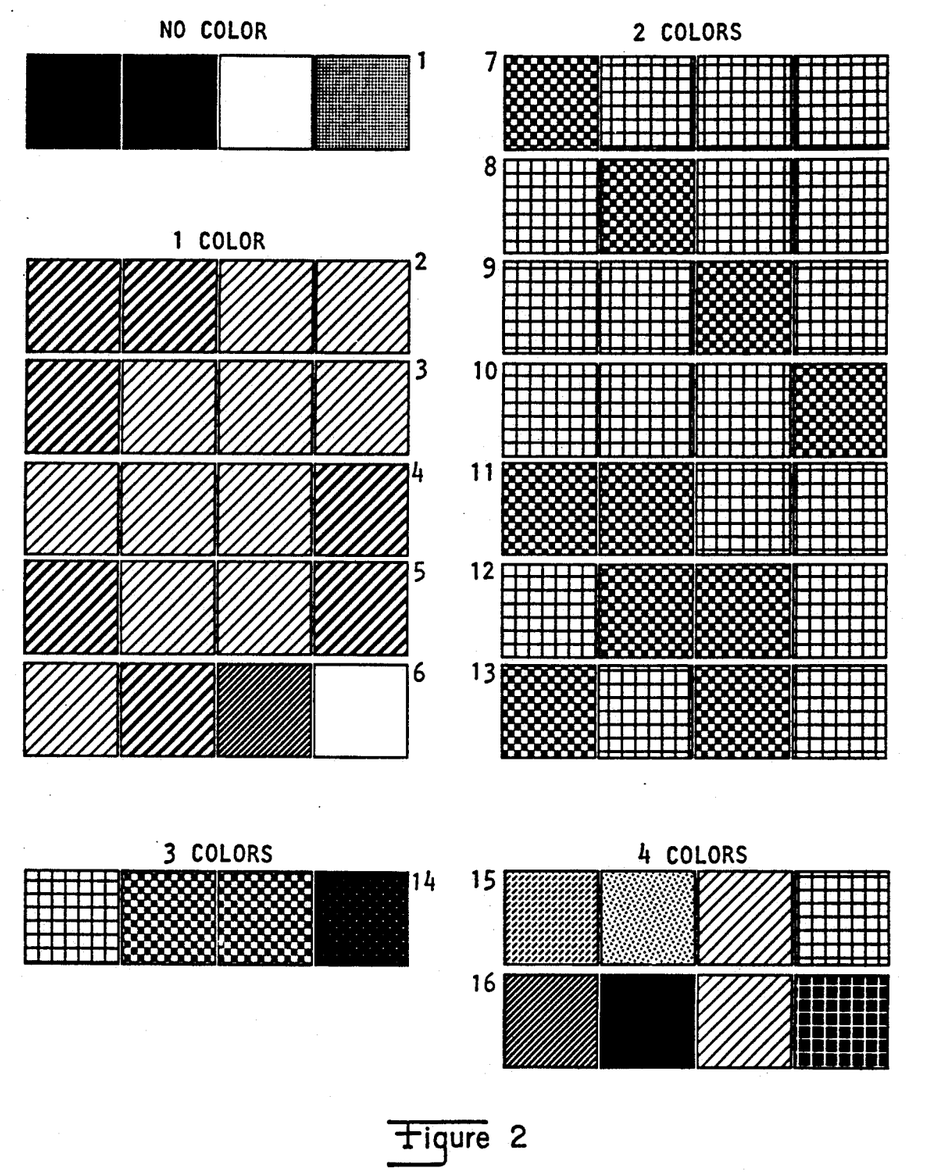
FIG. 2 is a diagram illustrating examples of how pixel blocks may be allocated in accordance with the present invention.

The next stage 108 detects which of several predefined types of pixel configurations the current block of pixels most closely approximates. In one embodiment of the invention, 16 different codes are used according to the configuration of four adjacent pixels. Referring now also to FIG. 2, the 16 different possible configurations are the following (y is for luminance and c is for color, i.e., u and v):

no color in the block: Case 1, all the pixels are gray.
only 1 single color in the block:
  Case 2, variation of y between the 2nd & 3rd pixels.
  Case 3, variation of y between the 1st & 2nd pixels.
  Case 4, variation of y between the 3rd & 4th pixels.
  Case 5, variation of y between the 1st & 2nd pixels and 3rd & 4th pixels.
  Case 6, variation of y between each pixel.
only 2 different colors in the block:
  Case 7, variation of c between 1st & 2nd pixels.
  Case 8, 2nd pixel has a different c from others.
  Case 9, 3rd pixel has a different c from others.
  Case 10, variation of c between 3rd & 4th pixels.
  Case 11, variation of c between 2nd & 3rd pixels.
  Case 12, same c for 2nd & 3rd pixels and same c for 1st & 4th pixels.
  Case 13, same c for 1st & 3rd pixels and same c for 2nd & 4th pixels.
3 different colors in the block: Case 14, same c for 2nd 3rd pixels;
all 4 pixels have a different color:
  Case 15, different c for each pixel.
  Case 16, very different c for each pixel.

If the configuration of a pixel block is not exactly one of these 16 configurations a default case for the particular configuration of the input pixel block is selected. If there is no variation of y or c the default case is the 2nd one, if there is a variation of y but not of c it is the 6th, if there is a variation of c it is the 15th.

In the preferred embodiment, a threshold value is used to determine whether there is a variation in y or c between two pixels and whether that variation is small or large. A threshold level of 16 is used to define "small" variations, and a threshold level of 64 is used to define "large" variations.

Figure 3:
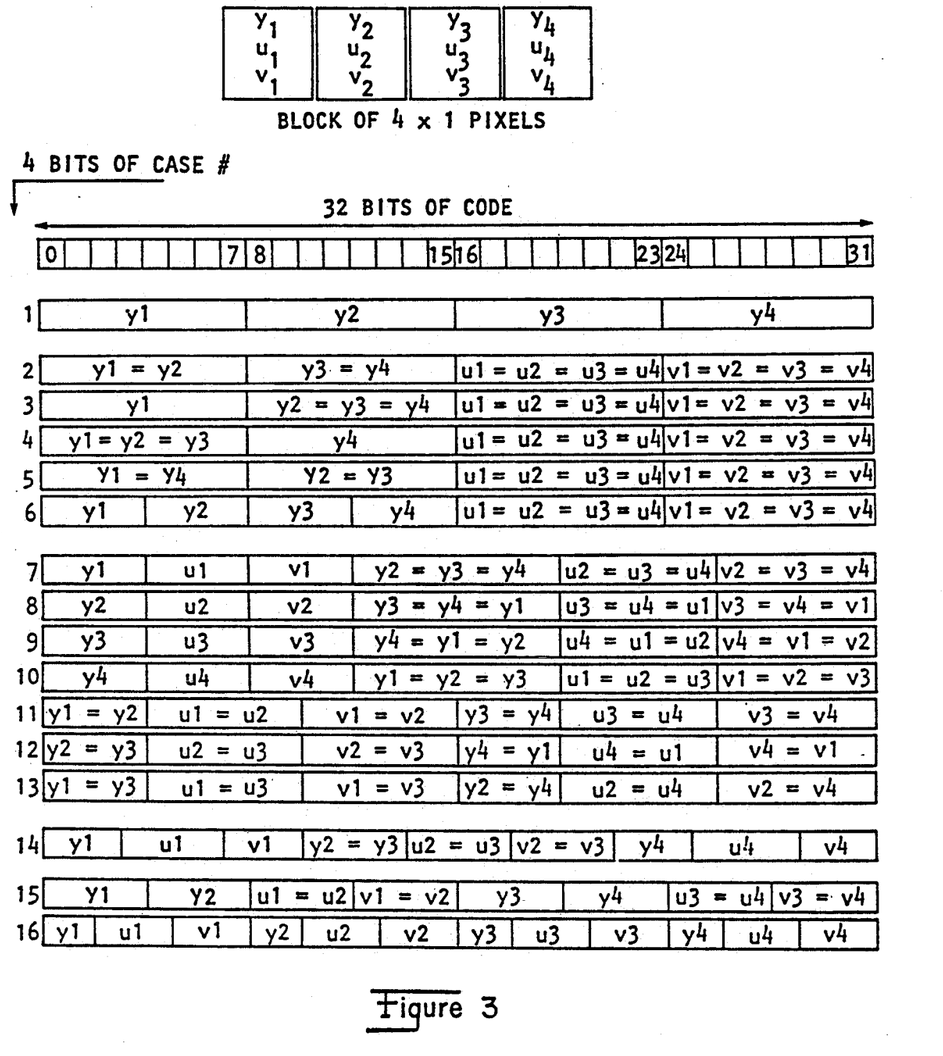
FIG. 3 illustrates bit configurations for each of the 16 pixel block allocations of a nine bit pixel depth implementation of the scheme of the present invention.

Once the allocation of pixel blocks to one of the standard configurations is made in stage 109, the actual coding of information is performed in accordance with the selected configuration in stage 110. The type and depth of information to be encoded is preselected for each configuration to maximize the retention of information that is important for each different configuration. For instance, in a case where all of the pixels are gray, there is no useful hue or saturation information. Thus, there is nothing to be gained by retaining hue or saturation information, and bits in this configuration can be completely allocated to transmitting luminance information at full depth. This will result in an extremely sharp displayed or printed gray-scaled image. In an embodiment using nine-bit pixel depth and grouping adjacent pixels together into blocks of four, the allocation of bits may be performed as illustrated in FIG. 3. Four bits of a 36-bit word are allocated to storing the case number for the configuration of a pixel block, and the remaining 32 bits are allocated as illustrated, specifically:

Case 1, 8 bits for each y value.
Cases 2-5, 2×8 bits for common u and v values and 2×8 bits for different y values.
Case 6, 2×8 bits for common u and v values, 4×4 bits for different y values.
Cases 7-10, 2×6 bits for common u and v values, 8 bits for common y value, 3×4 bits for different y, u and v values.
Cases 11-13, 2×2×6 bits for common u and v values, 2×4 bits for common y values.
Case 14, 3×4 bits for common y, u and v values, 2×3 bits for different y values, 2×4 bits for different u values, 2×3 bits for different v values.
Case 15, 2×2×4 bits for common u and v values, 4×4 bits for different y values.
Case 16, 4×2×3 bits for different u and v values, 4×2 bits for different y values.

Figure 4:
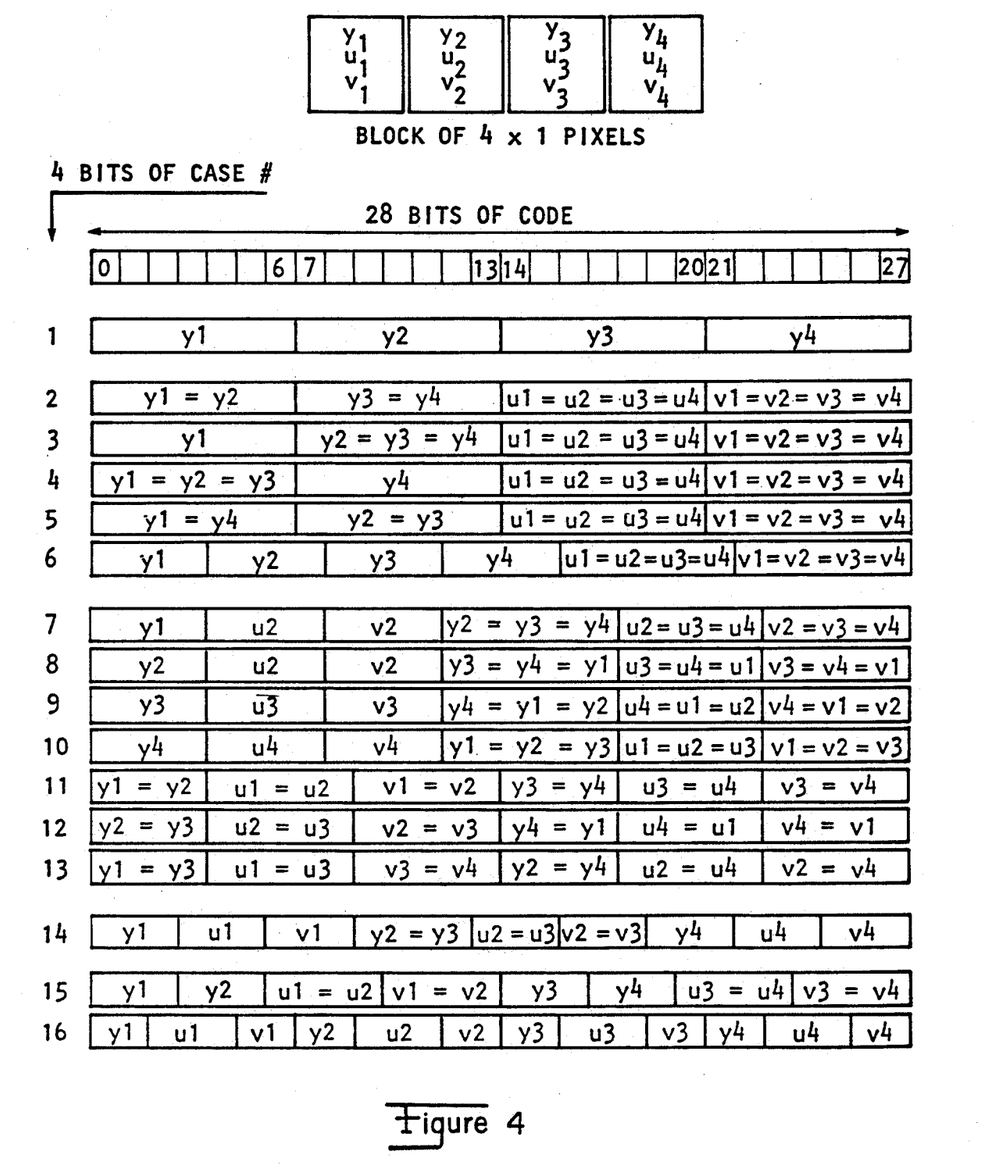
FIG. 4 illustrates bit configurations for each of the 16 pixel block allocations of an eight bit pixel depth implementation of the scheme of the present invention.

Referring now to FIG. 4, in an implementation using an eight bit pixel depth and blocks of four pixels, 32 bit words are used for each block, 4 bits are used to identify the configuration, and the remaining 28 bits are allocated as follows:

Case 1, 7 bits for each y value.

Cases 2-5, 2×7 bits for common u and v values and 2×7 bits for different y values.

Case 6, 2×7 bits for common u and v values, 4×4 bits for different y values.

Cases 7-10, 2×5 bits for common u and v values 6 bits for common y value, 3×4 bits for different y, u and v values.

Cases 11-13, 2×2×5 bits for common u and v values, 2×4 bits for common y values.

Case 14, 2×3 bits for common u and v values, 4 bits for common y value, 2×3 bits for different y values, 2×2×3 bits for each different u and v values.

Case 15, 2×2×4 bits for common u and v values, 4×3 bits for different y values.

Case 16, 4×3 bits for different u values, 4×2 bits for different v values, 4×2 bits for different y values.

Figure 5:
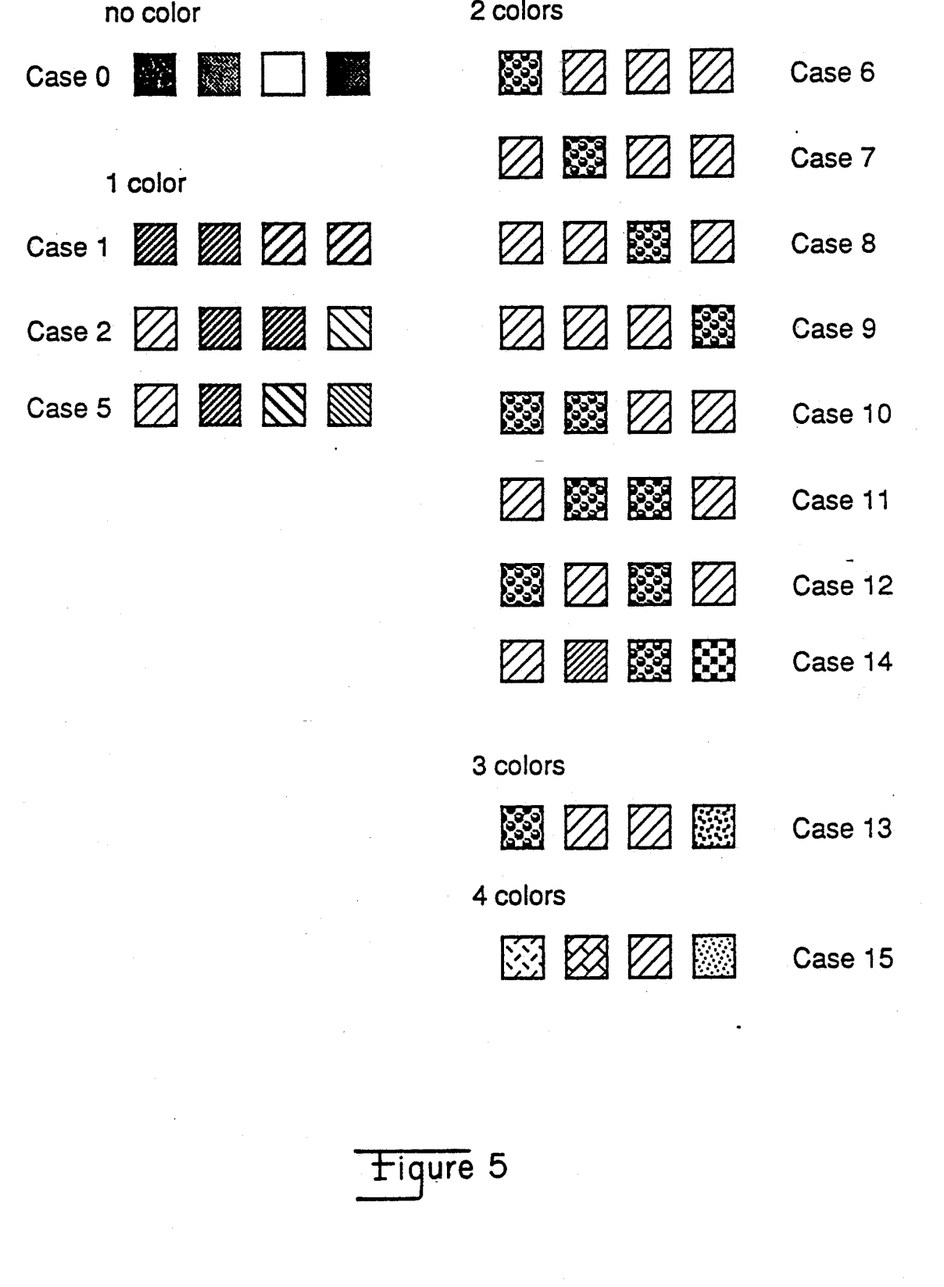
FIG. 5 is a diagram illustrating one method of pixel block allocation for a twelve bit pixel depth implementation in accordance with the present invention.

In an alternate embodiment of the invention, a twelve bit pixel depth is used. FIG. 5 illustrates 13 different configurations used in this embodiment:

no color in the block: Case 0, all the pixels are gray.

only 1 single color in the block:

Case 1, 1st & 2nd pixels share common y, 3rd & 4th pixels share common y.

Case 2, 2nd & 3rd pixels share common y.

Case 5, variation of y between each pixel.

only 2 different colors in the block:

Case 6, first pixel has different c and y from others.

Case 7, second pixel has different c and y from others.

Case 8, third pixel has different c and y from others.

Case 9, fourth pixel has different c and y from others.

Case 10, same c and y for 1st & 2nd pixels and same c and y for 3rd & 4th pixels.

Case 11, same c and y for 1st & 4th pixels and same c and y for 2nd & 3rd pixels.

Case 12, same c and y for 1st & 3rd pixels and same c and y for 2nd & 4th pixels.

Case 14, same c for 1st & 2nd pixels and same c for 3rd & 4th pixels, different y for each pixel.

3 different colors in the block: Case 13, same c and y for 2nd & 3rd pixels.

all 4 pixels have a different color: Case 15, different c and y for each pixel.

Figure 6:
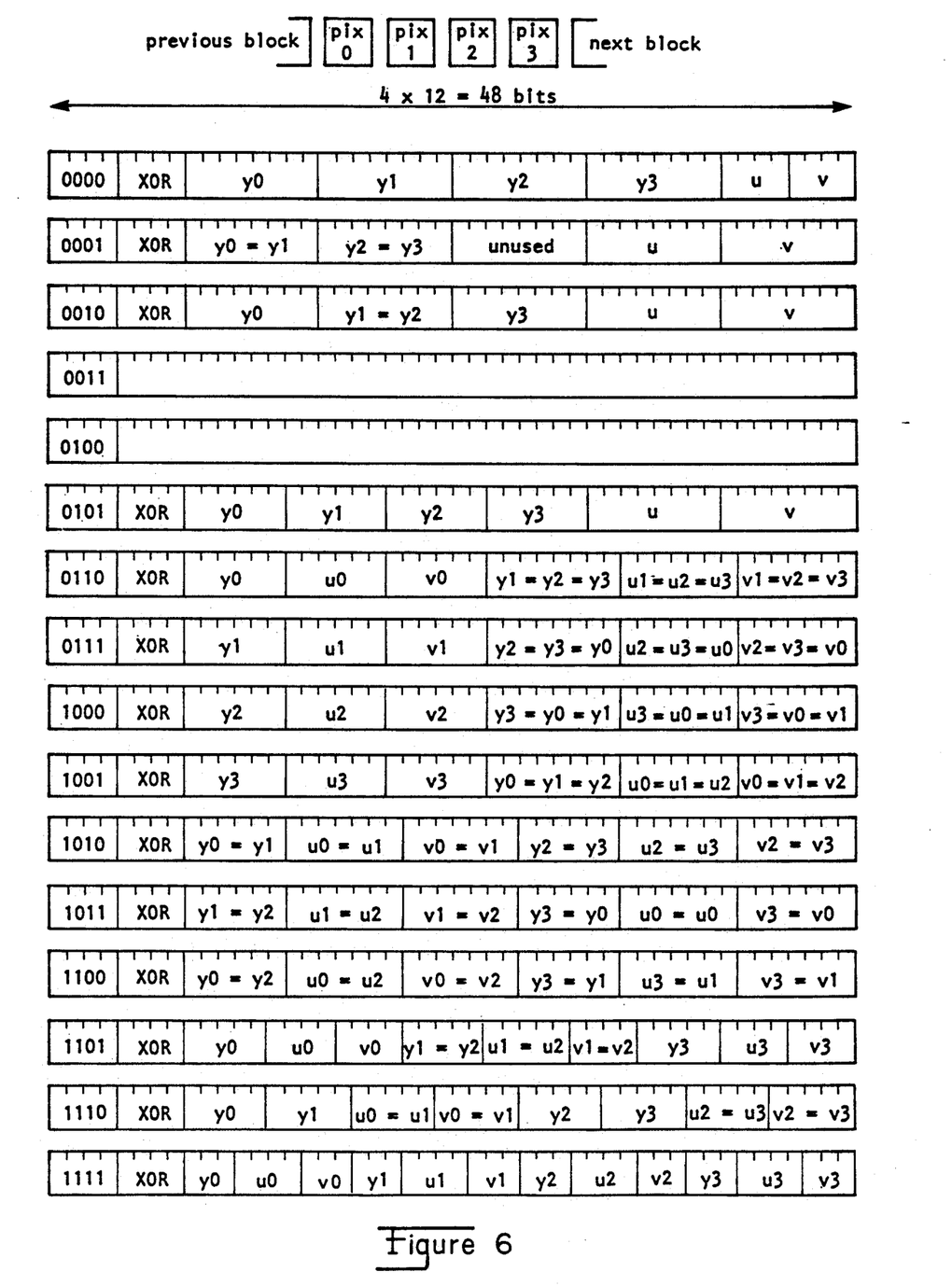
FIG. 6 illustrates bit configurations for each of the 13 pixel block allocations of a twelve bit pixel depth implementation of the scheme of the present invention.

As with the embodiment previously described, if the configuration of a pixel block is not exactly one of these configurations a default case for the particular configuration of the input pixel block is selected, and a threshold value is used to determine whether there is a variation in y or c between two pixels. In the embodiment using twelve bit pixel depth and grouping adjacent pixels together into blocks of four, the allocation of bits may be performed as illustrated in FIG. 6. As FIG. 6 shows, four bits of a 48-bit word are allocated to storing the case number for the pixel block. Four bits are used, one bit for each pixel in the block, for an "XOR" field. If the XOR bit for a pixel is set, the inverse (or opposite) r, g and b values for that pixel will be displayed. More specifically, if x is an eight bit r, g or b value, then 255-x will be the displayed r, g or b value if the XOR bit is set for that pixel. The use of an XOR field allows extremely fast highlighting of selected portions of a displayed image. The remaining 40 bits are allocated as illustrated, specifically:

Case 0, 4×8 bits for all y values and 2×4 bits for u and v values (u and v values included in the "no color" case because pixels with very slight color may be assigned to this case).

Case 1, 2×8 bits for common y values, 2×8 bits for common u and v values, and 8 bits unused.

Case 2, 3×8 bits for all y values and 2×8 bits for common u and v values.

Case 5, 2×8 bits for common u and v values, 4×6 bits for different y values.

Cases 6-9, 8 bits for common y value, 2×7 bits for common u and v values, 3×6 bits for different y, u and v values.

Cases 10-12, 2×2×7 bits for common u and v values, 2×6 bits for common y values.

Case 13, 3×5 bits for all y values, 5 bits for common u value, 5×4 bits for all other u and v values.

Case 14, 4×5 bits for all y values, 2×2×5 bits for common u and v values.

Case 15, 2×4×3 bits for all y and v values, 4 ×4 bits for different u values.

FIG. 6 shows that two more cases could be added to this allocation scheme for increased image quality or future applications, but these cases are not presently used in this embodiment.

As indicated in the description above, the embodiments of the present invention often must map eight bit y, u and v data words into words of smaller bit length. One simple scheme for doing this would be to simply use the most significant bits of the original word and discard the remaining (least significant) bits. However, this simple binary truncation yields significant errors for large-value words. For instance, the eight bit binary value 1111 1111 (decimal 255) when mapped to a four bit word would be simply 1111. When mapped back to an eight bit word, this value would be 1111 0000 (decimal 240).

To reduce such errors caused by truncation, it is desirable to have the smallest four bit number 0000 (decimal 0) correspond to the smallest eight bit number 0000 0000 (decimal 0) and to have the largest four bit number 1111 (decimal 15) correspond to the largest eight bit number 1111 1111 (decimal 255). For the values between theses two extremes to be equidistant, each four bit number should correspond exactly with an eight bit number that is a multiple of decimal 17, such as 0000 0000, 0001 0001, 0010 0010, etc. These numbers happen to be extremely easy to encode with four bits, since the most significant four bits and the least significant four bits are identical in each case. Therefore the transformation from an eight bit value to a four bit value is accomplished by rounding the eight bit value to the nearest multiple of 17 and using the four bit value corresponding to that multiple of 17. The rounding function is performed similarly to the rounding functions described above in connection with Equation Set 3: The original number is truncated after a value equal to one-half the truncation step has been added to it. The actual mapping is performed through the use of a look-up table or other conventional means, although in the case of eight bit to four bit transformation, the mapping may be accomplished simply by using the most significant four bits of the rounded eight bit word. Transformations from starting word lengths other than eight bits and to ending word lengths other than four bits may be accomplished in a similar manner.

In any sequence of transformation and re-transformation, it is possible to obtain "overflow" values outside the permissible range for a given word length. In such cases, to avoid overflow error the value used is the maximum or minimum, as applicable, for the given word size.

The implementations described herein achieve efficient use of memory by storing only once values of signals that are common between two or more pixels. However, since values will be considered common whenever they do not exceed a certain threshold value, a method for determining what to use as the "common" value is required. In the preferred embodiment, the average of the values for each of the pertinent pixels is used. This strategy helps to avoid error propagation that would result from simply using one of the values from a pertinent pixel.

Figure 7:
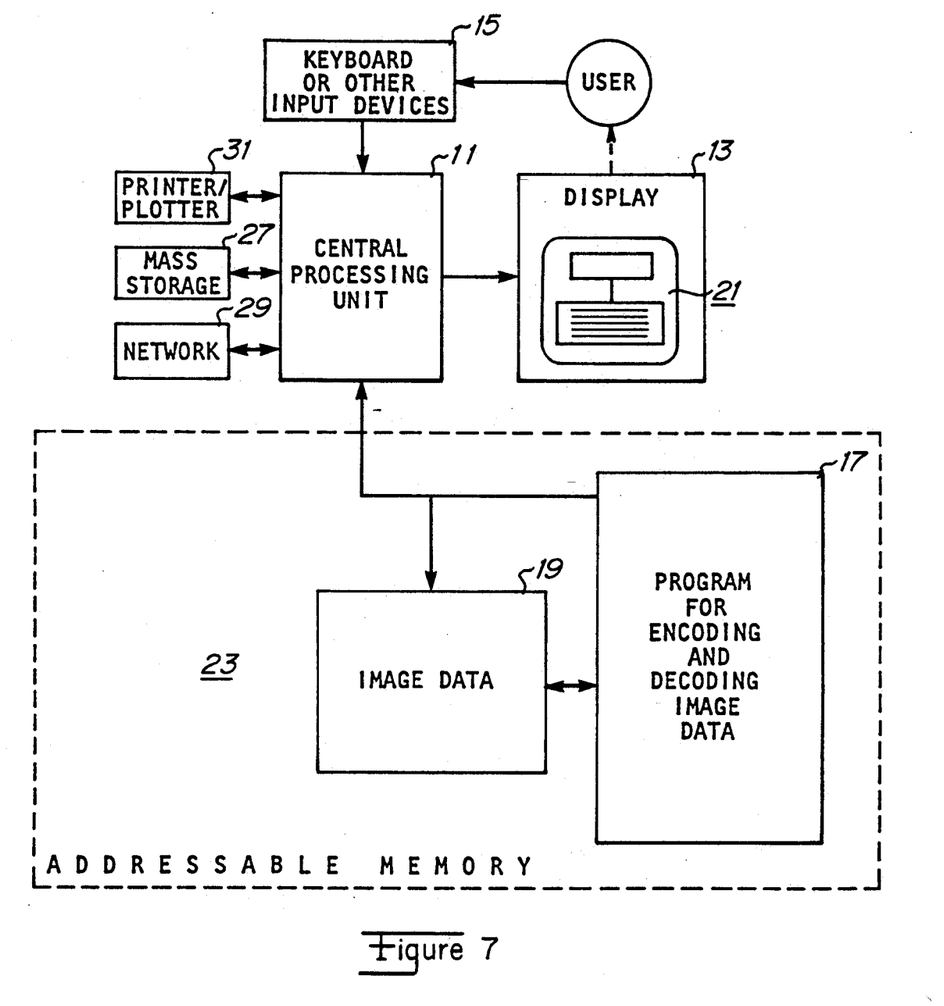
FIG. 7 is a system block diagram illustrating one possible implementation of the method of the present invention on a computer system.

Referring now to FIG. 7, there is illustrated a conventional computer system such as may be employed in connection with the method of the present invention. In the preferred embodiment, the method of the present invention operates on color image data in MACINTOSH microcomputers provided by Apple Computer, Inc., and is implemented by a computer program 17 stored in the addressable memory 23 of the computer system. The conventional computer system comprises a central processing unit 11 connected to a display 13 for image data 21, a printer/plotter 31, a mass storage device 31, a network connection 29, and addressable memory 23. When the computer program 17 embodying the present invention is not needed by the computer system, it may be stored in mass storage 27. To used the computer program 17, the central processing unit 11 copies the program 17 from mass storage 27 into addressable memory 23 and begins to execute the code of the program 17 to operate on color image data 19 provided by other portions of addressable memory 23, by the network connection 29, by mass storage 27 or elsewhere in the computer system. The manipulated image data may then be displayed as image data 21 on the display 13, printed on the printer/plotter 31, used or stored elsewhere in the computer system or transmitted to other systems through the network connection 29.

Referring again to FIG. 1, channel 102 may be any bus, processor or other transmission or processing channel. Operation of decoder 103 generally complements that of encoder 102. First, an incoming data word is processed to detect which configuration case applies to that block of pixels in detection stage 111. Based upon the information from stage 111, stage 112 decodes the information into the constituent y, u and v components. Stage 113 performs the reverse transform described above in connection with Equation Set 2 to recreate the r, g and b components from the y, u and v components, and stage 114 performs the processing of overflow values described previously. Finally, output stage 115 applies output signal 105 in synchronization with the display screen or printing device.

When the method of the present invention is implemented on conventional microcomputers to encode and decode image data that frequently changes, such as animation images, processing may not occur quickly enough to provide real-time display of the data. The displayed image may not appear to change smoothly, but block by block instead. This artifact is particularly apparent in the eight bit pixel depth embodiment. One simple method for increasing effective processing speed is to reduce the number of encoding choices. Satisfactory results are obtained, for instance, by encoding single color data as case number 6 in FIG. 2, even when case numbers 2-5 are actually detected, and by encoding four-color data as case number 15 when case numbers 15 or 16 are detected. The decoding scheme need not be altered. Not only does this alteration increase effective processing speed, it also frees additional cases for use in future applications.

As an additional disclosure, the source code for the portion of a computer software package, for operation on conventional "MACINTOSH" computer systems supplied by Apple Computer, Inc., that includes the preferred embodiment of the invention is provided as a microfiche appendix to this specification. It should be noted that terminology in the source code may differ slightly from that in the remainder of the specification. Any differences in terminology, however, will be easily understood by those skilled in the art.

Therefore, a method is provided for encoding color image information for efficient transmission or processing.

What is claimed is:

1. A method increasing effective processing speed for encoding, by a predetermined plurality of encoding schemes, color image information to be displayed by a conventional computer system, comprising the steps of:

choosing a subset of encoding schemes from said predetermined plurality of encoding schemes;

grouping together adjacent portions of said information into a plurality of blocks, all such blocks being of an identical fixed size;

for each of said blocks, selecting one encoding scheme of said subset of encoding schemes responsive to the portions of information comprising said block; and encoding said block by writing a single encoded data word of fixed size that comprises a code identifying said selected encoding scheme and a plurality of data segments, each segment having a particular number of data bits responsive to said image information in said block, arranged in accordance with said selected encoding scheme.

2. A method of increasing effective processing speed for encoding color image information to be displayed by a conventional computer system, comprising the steps of:

grouping together adjacent portions of said information into a plurality of blocks, all such blocks being of an identical fixed size;

for each of said blocks, selecting one of a plurality of encoding schemes responsive to the portions of information comprising said block, each of said plurality of encoding schemes providing an inverse data field representative of inverse display of said color image information; and encoding said block by writing, responsive to inverse display of said color image information, a first state of said inverse data field and, responsive to non-inverse display of said color image information, a second state of said inverse data field, said inverse data field forming a portion of a single encoded data word of fixed size that further comprises a code identifying said selected encoding scheme and a plurality of data segments, each segment having a particular number of data bits responsive to said image information in said block, arranged in accordance with said selected encoding scheme.

* * * * *